(12) United States Patent
Weisenstein et al.

(10) Patent No.: US 10,637,118 B2
(45) Date of Patent: Apr. 28, 2020

(54) POUCHED METAL-AIR BATTERY CELLS

(71) Applicant: ZAF Energy Systems Incorporated, Bozeman, MT (US)

(72) Inventors: Adam Weisenstein, Bozeman, MT (US); Paula J. Kosted, Rexford, MT (US); Joel Ballard, Columbia Falls, MT (US); Sean Barrett, Kalispell, MT (US); William A. Garcia, Bozeman, MT (US)

(73) Assignee: ZAF Energy Systems, Incorporated, Bozeman, MT (US)

(*) Notice: Subject to any disclaimer, the term of this patent is extended or adjusted under 35 U.S.C. 154(b) by 0 days.

(21) Appl. No.: 16/415,904

(22) Filed: May 17, 2019

(65) Prior Publication Data

US 2019/0273297 A1    Sep. 5, 2019

Related U.S. Application Data

(63) Continuation of application No. 15/167,075, filed on May 27, 2016, now Pat. No. 10,297,889.

(51) Int. Cl.
*H01M 12/08* (2006.01)
*H01M 2/02* (2006.01)
(Continued)

(52) U.S. Cl.
CPC ......... *H01M 12/08* (2013.01); *H01M 2/0255* (2013.01); *H01M 2/0275* (2013.01);
(Continued)

(58) Field of Classification Search
None
See application file for complete search history.

(56) References Cited

U.S. PATENT DOCUMENTS 3,436,270 A    4/1969   Oswin et al.
3,516,123 A    6/1970   Katsoutis et al.
(Continued)

FOREIGN PATENT DOCUMENTS

JP    2016024944 A    2/2016
KR    20140015671 A   2/2014
WO    2012074622 A1   6/2012

OTHER PUBLICATIONS

International Search Report and Written Opinion for Application No. PCT/US2017/033754, ISA/RU, Moscow, Russia, dated Oct. 19, 2017, 7 pgs.

*Primary Examiner* — Wyatt P McConnell
(74) *Attorney, Agent, or Firm* — Brooks Kushman P.C.

(57) ABSTRACT

A metal-air battery cell includes an electrode assembly and a sealed pouch. The electrode assembly includes an air electrode, a negative electrode, a separator in contact with and disposed between the electrodes, and a hydrophobic gas diffusion layer in contact with a side of the air electrode opposite the separator. The pouch envelops the electrode assembly and contains an electrolyte therein. The pouch is defined by a gas permeable hydrophobic flexible layer in contact with the hydrophobic gas diffusion layer. The electrode assembly further includes a terminal extending from and away at least one of the electrodes, and through the pouch. Opposing sides of the pouch are sealed to each other and around the terminal.

17 Claims, 3 Drawing Sheets

(51) Int. Cl.
  *H01M 2/06* (2006.01)
  *H01M 2/08* (2006.01)
(52) U.S. Cl.
  CPC ............... *H01M 2/06* (2013.01); *H01M 2/08* (2013.01); *Y02E 60/128* (2013.01)

(56) References Cited

U.S. PATENT DOCUMENTS

| | | |
|---|---|---|
| 3,960,600 A | 6/1976 | Chodosh |
| 5,567,540 A | 10/1996 | Stone et al. |
| 8,481,187 B2 | 7/2013 | Zhang et al. |
| 2008/0102358 A1* | 5/2008 | Kowalczyk ......... H01M 2/0277 |
| | | 429/127 |
| 2012/0140378 A1* | 6/2012 | Tan ....................... H01G 11/02 |
| | | 361/500 |

* cited by examiner

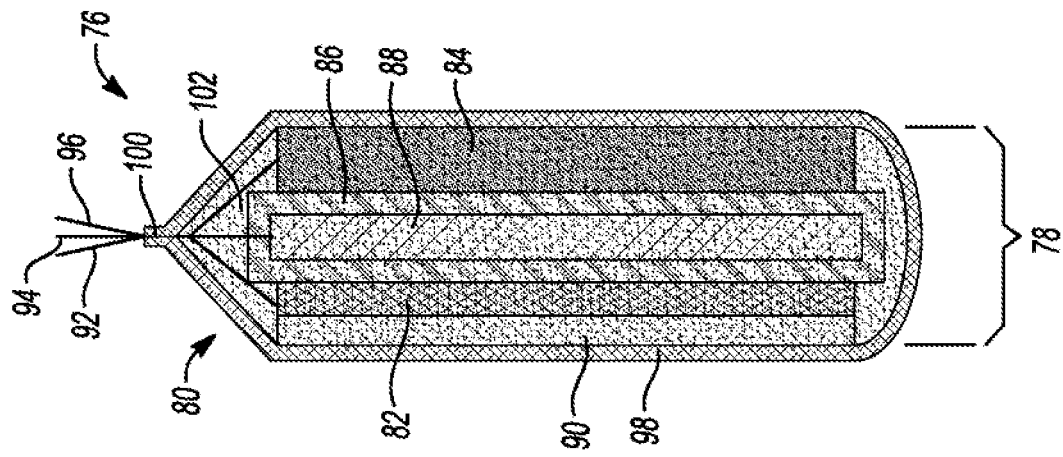
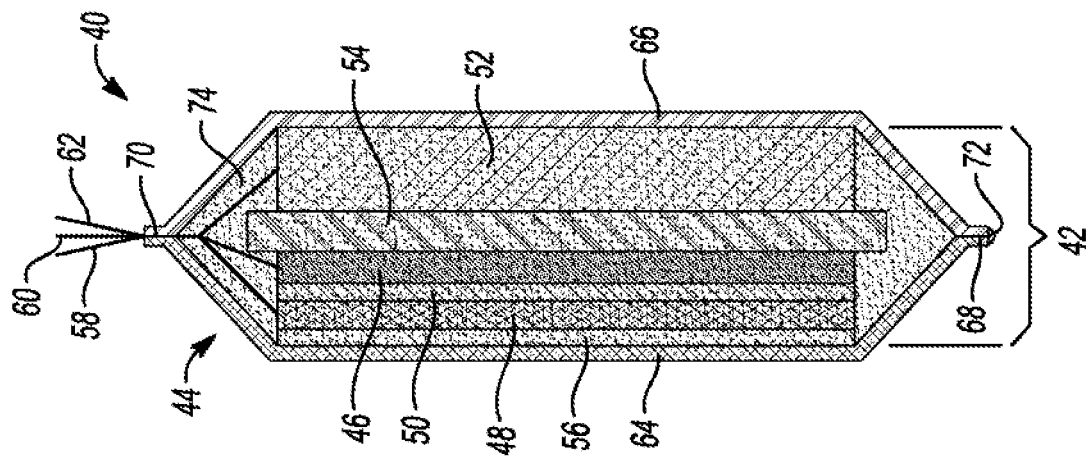
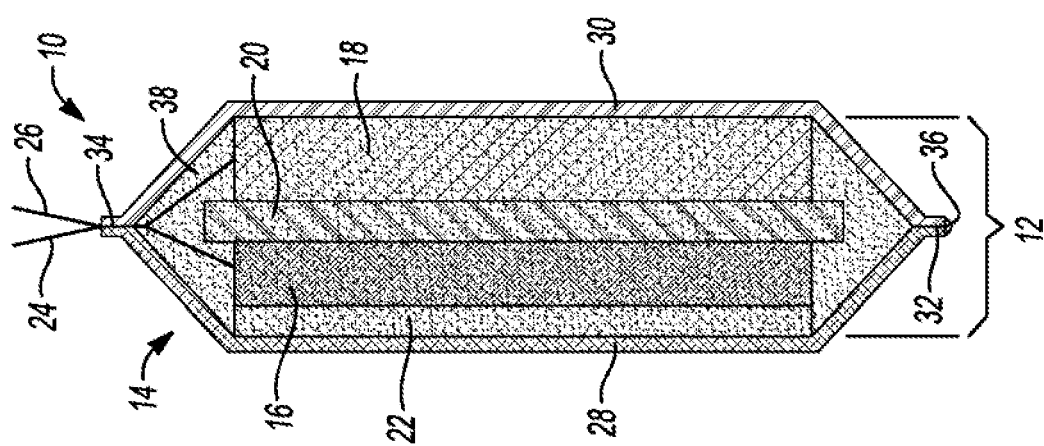

POUCHED METAL-AIR BATTERY CELLS

CROSS-REFERENCE TO RELATED APPLICATION

This application is a continuation of application Ser. No. 15/167,075, filed May 27, 2016, the entire contents of which are herein incorporated by reference.

TECHNICAL FIELD

This disclosure relates to metal-air batteries and electrodes therein.

BACKGROUND

Electrochemical devices, such as batteries and fuel cells, typically incorporate an electrolyte source to provide the anions or cations necessary to produce an electrochemical reaction. Batteries and fuel cells operate on the electrochemical reaction of hydrogen-air, metal-air, metal-halide, metal-hydride, metal-intercalation compounds, or other materials capable of electrochemical reaction.

Metal-air batteries (or metal-oxygen batteries) with aqueous and non-aqueous electrolytes have attracted industry interest for many years as these reactors can have high energy densities and be relatively inexpensive to produce. Sizes can range from the small to power hearing aids or cameras to the large to power vehicles.

A unique property of metal-oxygen batteries compared to other batteries is that the cathode active material (i.e., oxygen) is typically not stored in the battery. When the battery is exposed to the environment, oxygen enters the cell through an oxygen diffusion membrane and porous air electrode and is reduced at the surface of a catalytic air electrode, forming peroxide ions and/or oxide ions in non-aqueous electrolytes or hydroxide anions in aqueous electrolytes. As an example, a mass of metal can form a porous anode that is saturated with an electrolyte. During discharge, oxygen reacts at a cathode to form hydroxyl ions that migrate into the metal-electrolyte to form a metal hydroxide, releasing electrons to travel to a cathode. The metal hydroxide decays into metal oxide and the resulting water returns to the electrolyte. The water and hydroxyls from the anode are recycled at the cathode, so the water is not consumed. The reverse process can also occur. During charge, electrons react with the metal oxide to reform the metal, releasing hydroxyl ions that migrate to the cathode. The hydroxyl ions are then oxidized to oxygen gas and water.

SUMMARY

A metal-air battery has an electrode assembly including an air electrode, a negative electrode, a separator in contact with and disposed between the electrodes, and a hydrophobic gas diffusion layer in contact with a side of the air electrode opposite the separator. A gas permeable hydrophobic flexible layer defines a sealed pouch that envelops the electrode assembly, contains an electrolyte therein, and is in contact with the hydrophobic gas diffusion layer. The electrode assembly further includes a terminal extending from and away at least one of the electrodes, and through the pouch. Opposing sides of the pouch are in contact with the terminal and sealed to each other around the terminal.

An electrochemically rechargeable metal-air battery cell has an electrode assembly including an oxygen evolution electrode, an oxygen reduction electrode, and an ionically-conductive electrically-insulating oxygen-directing layer in contact with and disposed between the oxygen evolution and oxygen reduction electrodes. The electrode assembly also includes a negative electrode, a separator in contact with and disposed between the oxygen evolution and negative electrodes, and a hydrophobic gas diffusion layer in contact with the oxygen reduction electrode. The electrochemically rechargeable metal-air battery cell also has a gas permeable hydrophobic flexible layer defining a sealed pouch that envelops the electrode assembly, contains an electrolyte therein, and is in contact with the hydrophobic gas diffusion layer. The electrode assembly further includes a terminal extending from and away at least one of the electrodes, and through the pouch. Opposing sides of the pouch are in contact with the terminal and sealed to each other around the terminal.

BRIEF DESCRIPTION OF THE DRAWINGS

FIGS. 1-3 are side schematic views, in cross-section, of metal-air battery cells.

DETAILED DESCRIPTION

Figure 4:
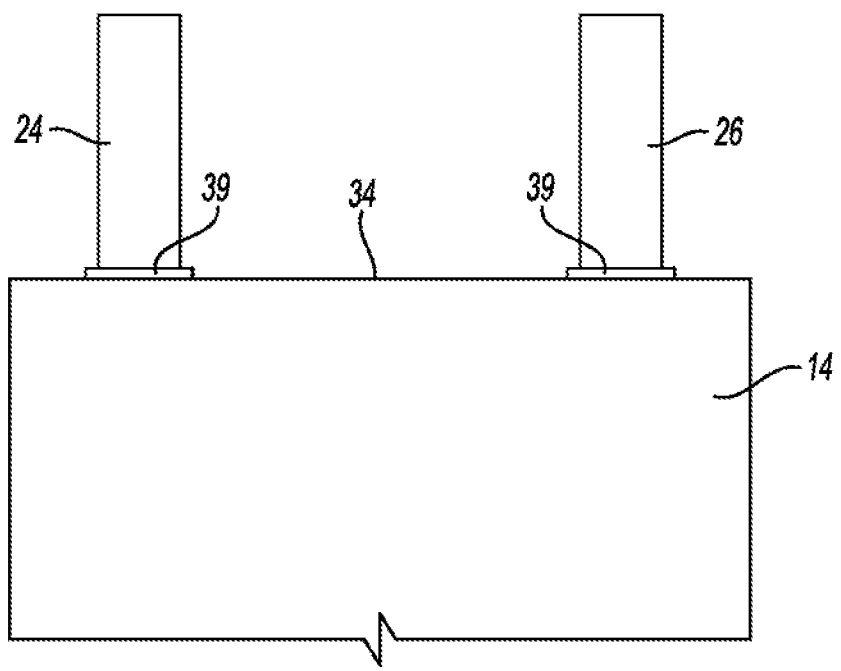
FIG. 4 is a front schematic view of the terminal portion of the metal-air battery cell of FIG. 1.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Containment of a metal-air battery usually requires complex ridged structures with pressure seals or adhesives to contain moisture, while also allowing the passage of air to the positive electrode. Here, metal-air pouch cells are described that can contain moisture and also allow the access of needed air by, for example, sealing a gas permeable and hydrophobic material to a gas and liquid impermeable material. The gas permeable and hydrophobic material may allow gas flow to the air electrode while deterring the escape of moisture due to its hydrophobic nature. This material can be heat sealed, at ends of the pouch, to a gas and liquid impermeable material. Such a pouch may be simple, light weight, thin, easily manufactured, and cost effective, while providing all of the necessary containment functions for a metal-air cell.

Referring to FIG. 1, a metal-air battery cell 10 (e.g., an electrochemically rechargeable battery cell, a primary battery cell, etc.) includes an electrode assembly 12 and a pouch 14. The electrode assembly 12 includes an air electrode (e.g., a bi-directional air electrode) 16, a negative electrode (e.g., zinc electrode) 18, and a separator (or membrane) 20 in contact with and between the electrodes 16, 18. The electrode assembly 12 also includes a hydrophobic gas diffusion layer 22 in contact with the side of the air electrode 16 opposite the separator 20. Terminals 24, 26 are in contact with, and extend from and away ends of the electrodes 16, 18 respectively.

The pouch 14 includes a gas permeable hydrophobic flexible layer 28 in contact with the hydrophobic gas diffusion layer 22, and a gas and liquid impermeable flexible layer 30 in contact with the negative electrode 18 such that the gas permeable hydrophobic flexible layer 28 is not in contact with the negative electrode 18, and the gas and liquid impermeable flexible layer 30 is not in contact with the hydrophobic gas diffusion layer 22. The gas permeable hydrophobic flexible layer 28 can be non-sintered polytetrafluoroethylene. It can also be polymeric and chemically inert in an alkaline environment.

The layers 28, 30 are sealed (e.g., heat sealed) to each other around a perimeter of the pouch 14. The layers 28, 30 thus define a first end seam 32 and a second end seam 34. In the embodiment of FIG. 1, the second end seam 34 is located adjacent to the terminals 24, 26. As such, the terminals 24, 26 extend through the pouch 14 at the second end seam 34. That is, the layers 28, 30 are sealed to each other and (adhesively) around the terminals 24, 26. Also in the embodiment of FIG. 1, the second end seam 34 is located at an end of the cell 10 opposite the first end seam 32. Moreover, a thermoplastic hot melt or other adhesive 36 can define a secondary seam on the first end seam 32 (and/or second end seam 34, and/or around some/all of the perimeter of the pouch 14). As a result, the pouch 14 envelops the electrode assembly 12 and contains an electrolyte 38 within which the electrode assembly 12 is immersed, in contact with, or wetted. The electrolyte 38 may be acidic, alkaline, or neutral. And, it may be a gel, an ionic liquid, a liquid, or a solid.

Referring to FIG. 2, an electrochemically rechargeable metal-air battery cell 40 includes an electrode assembly 42 and a pouch 44. The electrode assembly 42 includes an oxygen evolution electrode 46 (charging air electrode) that is permeable to electrolyte, an oxygen reduction electrode 48 (discharging air electrode), and an conically-conductive electrically-insulating oxygen-directing layer 50 in contact with and between the oxygen evolution and oxygen reduction electrodes 46, 48. The electrode assembly 42 further includes a negative electrode (e.g., zinc electrode) 52, a separator (or membrane) 54 in contact with and between the oxygen evolution and negative electrodes 46, 52, and, a hydrophobic gas diffusion layer 56 in contact with the oxygen reduction electrode 48. Terminals 58, 60, 62 are in contact with, and extend from and away ends of the electrodes 48, 46, 52 respectively.

The pouch 44 includes a gas permeable hydrophobic flexible layer 64 in contact with the hydrophobic gas diffusion layer 56, and a gas and liquid impermeable flexible layer 66 in contact with the negative electrode 52 such that the gas permeable hydrophobic flexible layer 64 is not in contact with the negative electrode 52, and the gas and liquid impermeable flexible layer 66 is not in contact with the hydrophobic gas diffusion layer 56. The gas permeable hydrophobic flexible layer 64 can be non-sintered polytetrafluoroethylene. It can also be polymeric and chemically inert in an alkaline environment.

The layers 64, 66 are sealed (e.g., heat sealed) to each other around a perimeter of the pouch 14. The layers 64, 66 thus define a first end seam 68 and a second end seam 70. In the embodiment of FIG. 2, the second end seam 70 is located adjacent to the terminals 58, 60, 62. As such, the terminals 58, 60, 62 extend through the pouch 44 at the second end seam 70. That is, the layers 64, 66 are sealed to each other and (adhesively) around the terminals 58, 60, 62. Also in the embodiment of FIG. 2, the second end seam 70 is located at an end of the cell 40 opposite the first end seam 68. Moreover, a thermoplastic hot melt or other adhesive 72 can define a secondary seam on the first end seam 68 (and/or second end seam 70, and/or around some/all of the perimeter of the pouch 14). As a result, the pouch 44 envelops the electrode assembly 42 and contains an electrolyte 74 within which the electrode assembly 42 is immersed, in contact with, or wetted. The electrolyte 74 may be acidic, alkaline, or neutral. And, it may be a gel, an ionic liquid, a liquid, or a solid.

Referring to FIG. 3, an electrochemically rechargeable metal-air battery cell 76 includes an electrode assembly 78 and a pouch 80. The electrode assembly 78 includes an oxygen reduction electrode 82 (discharging air electrode), an oxygen evolution electrode 84 (charging air electrode), and a separator (or membrane) 86 completely encasing a negative electrode (e.g., zinc electrode) 88 and in contact with and between the electrodes, 82, 84. The electrode assembly 78 also includes a hydrophobic gas diffusion layer 90 in contact with the side of the oxygen reduction electrode 82 opposite the separator membrane 86. Terminals 92, 94, 96 are in contact with, and extend from and away ends of the electrodes 82, 88, 84 respectively.

The pouch 80 includes a gas permeable hydrophobic flexible layer 98, which can be non-sintered polytetrafluoroethylene, or polymeric and chemically inert in an alkaline environment. It is in contact with the oxygen evolution electrode 84 and the hydrophobic gas diffusion layer 90. That is, the gas permeable hydrophobic flexible layer 98 wraps around the electrode assembly 78 and is sealed (e.g., heat sealed) to itself on three sides thereof (or four sides if two sheets of the gas permeable hydrophobic flexible layer 98 are used). A first end seam 100 associated with the three-sided seal is shown in the embodiment of FIG. 3. As with earlier embodiments, the terminals 92, 94, 96 extend through the pouch 80 at the first end seam 100: The gas permeable hydrophobic flexible layer 98 is sealed to itself and (adhesively) around the terminals 92, 94, 96. As a result, the pouch 80 envelops the electrode assembly 78 and contains an electrolyte 102 within which the electrode assembly 78 is immersed, in contact with, or wetted. The electrolyte 102 may be acidic, alkaline, or neutral. And, it may be a gel, an ionic liquid, a liquid, or a solid.

Figure 5:
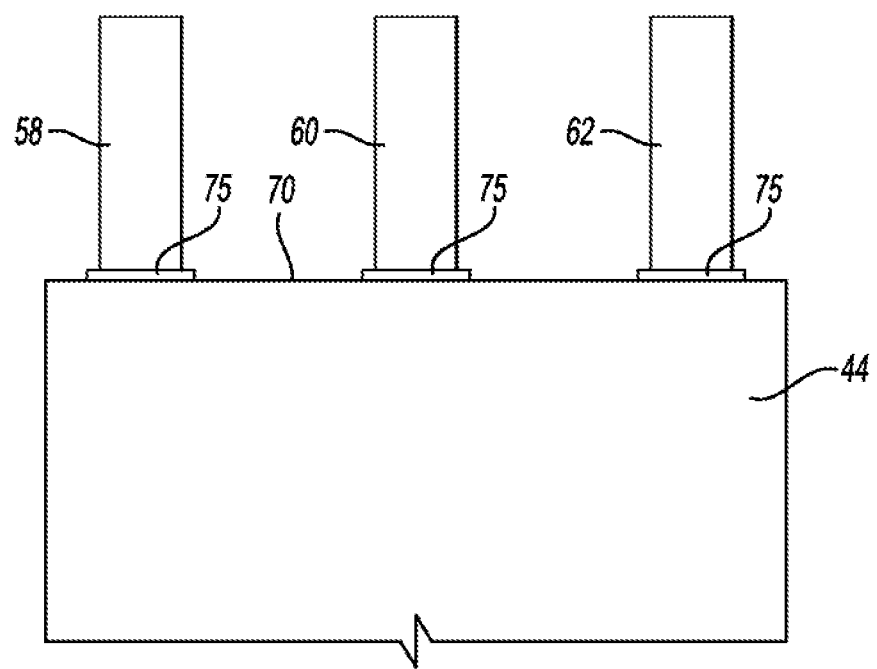
FIG. 5 is a front schematic view of the terminal portion of the metal-air battery cell of FIG. 2.

Referring to FIG. 4, the seal around the terminals 24, 26 can include a thermoplastic adhesive 39 configured to create a liquid impermeable seal around the terminals 24, 26. Likewise, referring to FIG. 5, the seal around the terminals 58, 60, 62 can include a thermoplastic adhesive 75 configured to create a liquid impermeable seal around the terminals 58, 60, 62. A similar arrangement can be used for the embodiment of FIG. 3.

Figure 6:
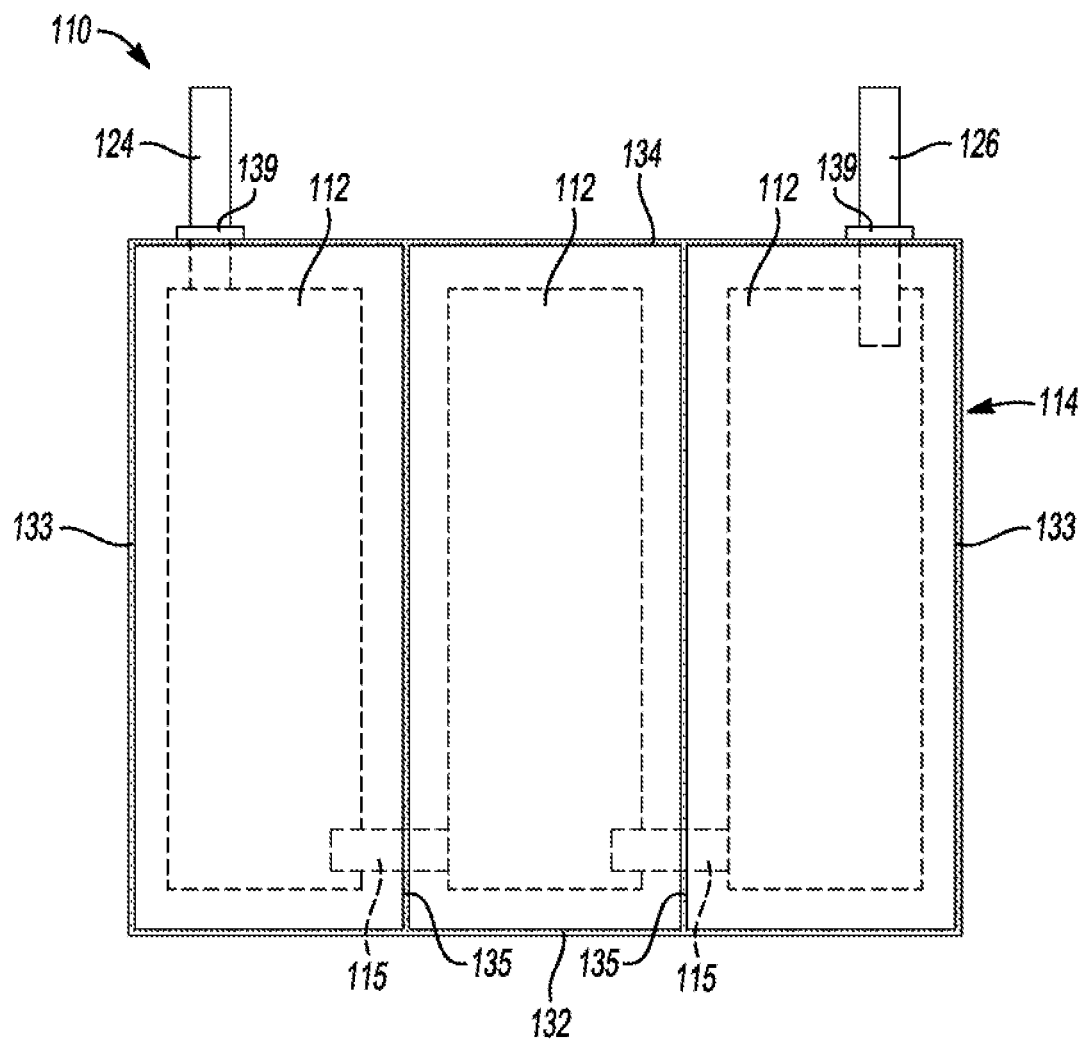
FIG. 6 is a front schematic view of a series connected multi-electrode assembly within a single pouch.

Referring to FIG. 6, a metal-air battery cell 110 includes a plurality of electrode assemblies 112 and a pouch 114. Each of the electrode assemblies 112 is configured similar to the electrode assembly 12 of FIG. 1. Additionally, internal tabs 115 electrically connect the electrode assemblies 112, and terminals 124, 126 are in contact with, and extend from and away ends of some of the electrode assemblies 112 respectively.

The pouch 114 is configured similar to the pouch 14 of FIG. 1. In addition to first and second ends seams 132, 134 however, side seams 133 and separating seams 135 are also shown. Separating seams 135, as the name suggests, separate the electrode assemblies 112 and associated electrolyte. A thermoplastic adhesive 139, as described with reference to FIG. 4, is configured to create a liquid impermeable seal around the terminals 124, 126. Other arrangements are also contemplated.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A metal-air battery cell comprising:
   an electrode assembly including an air electrode, a negative electrode, a separator in contact with and disposed between the electrodes, and a hydrophobic gas diffusion layer in contact with a side of the air electrode opposite the separator; and
   a gas permeable hydrophobic flexible layer defining a sealed pouch that envelops the electrode assembly, contains an electrolyte therein, and is in contact with the hydrophobic gas diffusion layer, the electrode assembly further including a terminal extending from and away at least one of the electrodes, and through the pouch, and opposing ends of the gas permeable hydrophobic flexible layer being in contact with the terminal and sealed to each other around the terminal.

2. The battery cell of claim 1, wherein the gas permeable hydrophobic flexible layer is non-sintered polytetrafluoroethylene.

3. The battery cell of claim 1, wherein the opposing ends of the gas permeable hydrophobic flexible layer are sealed to each other via heat sealing.

4. The battery cell of claim 1 further comprising an adhesive seal around the terminal.

5. The battery cell of claim 1 further comprising a thermoplastic hot melt defining a seal on a seam of the pouch.

6. The battery cell of claim 1 further comprising a thermoplastic adhesive configured to create a liquid impermeable seal around the terminal.

7. The battery cell of claim 1 further comprising another electrode assembly disposed within the sealed pouch.

8. The battery cell of claim 1, wherein the electrolyte is acidic, alkaline, or neutral.

9. The battery cell of claim 1, wherein the electrolyte is a gel, an ionic liquid, a liquid, or a solid.

10. An electrochemically rechargeable metal-air battery cell comprising:
    an electrode assembly including
       an oxygen evolution electrode, an oxygen reduction electrode, and an ionically-conductive electrically-insulating oxygen-directing layer in contact with and disposed between the oxygen evolution and oxygen reduction electrodes,
       a negative electrode,
       a separator in contact with and disposed between the oxygen evolution and negative electrodes, and
       a hydrophobic gas diffusion layer in contact with the oxygen reduction electrode; and
    a gas permeable hydrophobic flexible layer defining a sealed pouch that envelops the electrode assembly, contains an electrolyte therein, and is in contact with the hydrophobic gas diffusion layer, the electrode assembly further including a terminal extending from and away at least one of the electrodes, and through the pouch, and opposing ends of the gas permeable hydrophobic flexible layer being in contact with the terminal and sealed to each other around the terminal.

11. The battery cell of claim 10, wherein the gas permeable hydrophobic flexible layer is non-sintered polytetrafluoroethylene.

12. The battery cell of claim 10, wherein the opposing ends of the gas permeable hydrophobic flexible layer are sealed to each other via heat sealing.

13. The battery cell of claim 10 further comprising an adhesive seal around the terminal.

14. The battery cell of claim 10 further comprising a thermoplastic hot melt defining a secondary seal on a seam of the pouch.

15. The battery cell of claim 10 further comprising a thermoplastic adhesive configured to create a liquid impermeable seal around the terminal.

16. The battery cell of claim 10, wherein the electrolyte is acidic, alkaline, or neutral.

17. The battery cell of claim 10, wherein the electrolyte is a gel, an ionic liquid, a liquid, or a solid.

* * * * *